(12) United States Patent
Abraham et al.

(10) Patent No.: US 8,004,992 B2
(45) Date of Patent: Aug. 23, 2011

(54) ADDING HYBRID ARQ TO WLAN PROTOCOLS WITH MAC BASED FEEDBACK

(75) Inventors: Santosh Abraham, San Diego, CA (US); Saishankar Nandagopalan, San Diego, CA (US); Sanjiv Nanda, Ramona, CA (US); Ashwin Sampath, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 730 days.

(21) Appl. No.: 12/041,525

(22) Filed: Mar. 3, 2008

(65) Prior Publication Data

US 2009/0219851 A1 Sep. 3, 2009

(51) Int. Cl.
*H04L 1/00* (2006.01)
*H04L 12/26* (2006.01)
*H04W 4/00* (2009.01)
*H04L 12/28* (2006.01)
*H04L 12/56* (2006.01)

(52) U.S. Cl. ............... 370/236; 370/395.53; 370/328
(58) Field of Classification Search .......... 370/229, 370/235, 236, 328, 395.53
See application file for complete search history.

(56) References Cited

U.S. PATENT DOCUMENTS

| 2005/0226159 A1 | 10/2005 | Terry et al. | |
|---|---|---|---|
| 2005/0286426 A1* | 12/2005 | Padhye et al. | 370/238 |
| 2008/0019312 A1 | 1/2008 | Venkatachalam et al. | |
| 2008/0049754 A1* | 2/2008 | Kim et al. | 370/394 |
| 2009/0003257 A1* | 1/2009 | Kumar et al. | 370/314 |

FOREIGN PATENT DOCUMENTS

| EP | 1770897 A1 | 4/2007 |
|---|---|---|
| WO | WO2005022818 A1 | 3/2005 |

OTHER PUBLICATIONS

International Search Report and Written Opinion—PCT/US2009l035930, International Search Authority—European Patent Office—Dec. 11, 2009.
Zhifeng Tao et al., "Performance Improvement for Multichannel HARQ Protocol in Next Generation WiMAX System" Wireless Communications and Networking Conference, 2008. WCNC 2008. IEEE, IEEE, Piscataway, NJ, USA, Mar. 31, 2008, pp. 2009-2014, XP031243942, ISBN: 978-1-4244-1997-5, Section II.

* cited by examiner

*Primary Examiner* — Ronald Abelson
(74) *Attorney, Agent, or Firm* — Dang M. Vo (57) ABSTRACT

A wireless node having a MAC layer configured to coordinate access to a shared wireless medium using a MAC protocol, a PHY layer configured to provide an interface to the shared wireless medium, and a HARQ layer between the MAC and PHY layers, the HARQ layer being configured to support HARQ using the MAC protocol.

70 Claims, 7 Drawing Sheets

ADDING HYBRID ARQ TO WLAN PROTOCOLS WITH MAC BASED FEEDBACK

BACKGROUND

1. Field

This disclosure relates generally to wireless communication and more specifically, but not exclusively, to techniques for adding hybrid ARQ to WLAN protocols with MAC based feedback.

2. Introduction

In Automatic Repeat reQuest (ARQ) schemes, an error detection code is added to an encoded data packet before transmission to a receiver. The receiver attempts to decode the packet and uses the error detection code to determine whether or not it has been successful. If successfully decoded, the receiver sends an acknowledgement (ACK) back to the transmitter. Otherwise, the receiver sends a negative acknowledgement (NACK) back to the transmitter requesting retransmission of the data packet. A common example of an error detection code is a cyclic redundancy check (CRC) code.

In addition to a error detection code, the data packet may be additionally protected with an error correction code. Error correction coding generally involves generating several symbols for each bit in the data packet. The symbols include "systematic symbols" and "parity symbols." The systematic symbols represent the bits in the data packet and the parity symbols provide redundancy. This redundancy may be used by the receiver to correct errors in the transmission due to disturbances in the communication channel. The error detection code may be used to determine whether or not the receiver was able to successfully decode the data packet (i.e., correct all the transmission errors). Based on this determination, the receiver provides feedback to the transmitter using an ACK based protocol. This technique is often referred to as hybrid ARQ (HARQ).

Incremental redundancy is a more sophisticated type of HARQ which designed to be more robust in environments with fluctuating channel conditions. When incremental redundancy is used, the first transmission contains only systematic symbols with error detection. If the transmission is successfully decoded by the receiver, an ACK is sent back to the transmitter. If the receiver is unable to decode the transmission, then a second transmission will contain a selected number of parity symbols with error detection. Decoding is again attempted at the receiver by combining the systematic symbols with the transmitted parity symbols. If a retransmission is required, the transmitter sends additional parity symbols with error detection. This procedure is repeated until all the parity symbols are transmitted.

Recently, there has been a tremendous growth in the deployment of Wireless Local Area Networks (WLAN), such as IEEE 802.11 and the like. As these networks become more prevalent and begin working in closer proximity to one another, frequency reuse will be increasingly important to ensure efficient medium utilization. Such frequency reuse will cause the signal-to-noise ratio (SNR) at the receiver to fluctuate rapidly. The current convolutional codes are not robust to such variations in SNR, and as a result, a large fraction of data packet transmissions will have to be discarded by the receiver, thereby reducing the efficiency of the network.

Accordingly, there is a need in the art to add HARQ to a wireless transmission protocol for a WLAN, such as IEEE 802.11 and the like. However, in many WLAN, where the ACK based protocol is implemented in the MAC layer, the current techniques do not support the implementation of HARQ.

SUMMARY

In one aspect of the disclosure, an apparatus for wireless communications includes a MAC layer configured to coordinate access to a shared wireless medium using a MAC protocol, a PHY layer configured to provide an interface to the shared wireless medium, and an HARQ layer between the MAC and PHY layers, the HARQ layer being configured to support HARQ using the MAC protocol.

In another aspect of the disclosure, a method for wireless communications includes coordinating access to a shared wireless medium using a MAC protocol, providing an interface to the shared wireless medium, and supporting HARQ using the MAC protocol.

In yet another aspect of the disclosure, an apparatus for wireless communications includes means for coordinating access to a shared wireless medium using a MAC protocol, means for providing an interface to the shared wireless medium, and means for supporting HARQ using the MAC protocol.

In a further aspect of the disclosure, a computer-program product for wireless communications includes a machine-readable medium comprising instructions executable by a processing system to coordinate access to a shared wireless medium using a MAC protocol, provide an interface to the shared wireless medium, and support HARQ using the MAC protocol.

In yet a further aspect of the disclosure, an access terminal for wireless communications includes a user interface, an application layer configured to support the user interface, a MAC layer configured to coordinate access to a shared wireless medium using a MAC protocol to support the application layer, a PHY layer configured to provide an interface to the shared wireless medium, and an HARQ layer between the MAC and PHY layers, the HARQ layer being configured to support HARQ using the MAC protocol.

In yet another aspect of the disclosure, an access point includes a wireless network adapter configured to support a backhaul for a peer node to a network, a MAC layer configured to coordinate access to a shared wireless medium using a MAC protocol to support communications with the peer node, a PHY layer configured to provide an interface to the shared wireless medium, and an HARQ layer between the MAC and PHY layers, the HARQ layer being configured to support HARQ using the MAC protocol.

It is understood that other aspects of the invention will become readily apparent to those skilled in the art from the following detailed description, wherein various aspects of the invention are shown and described by way of illustration. As will be realized, the invention is capable of other and different configurations and implementations and its several details are capable of modification in various other respects, all without departing from the scope of this disclosure. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

BRIEF DESCRIPTION OF THE DRAWINGS

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

Figure 1:
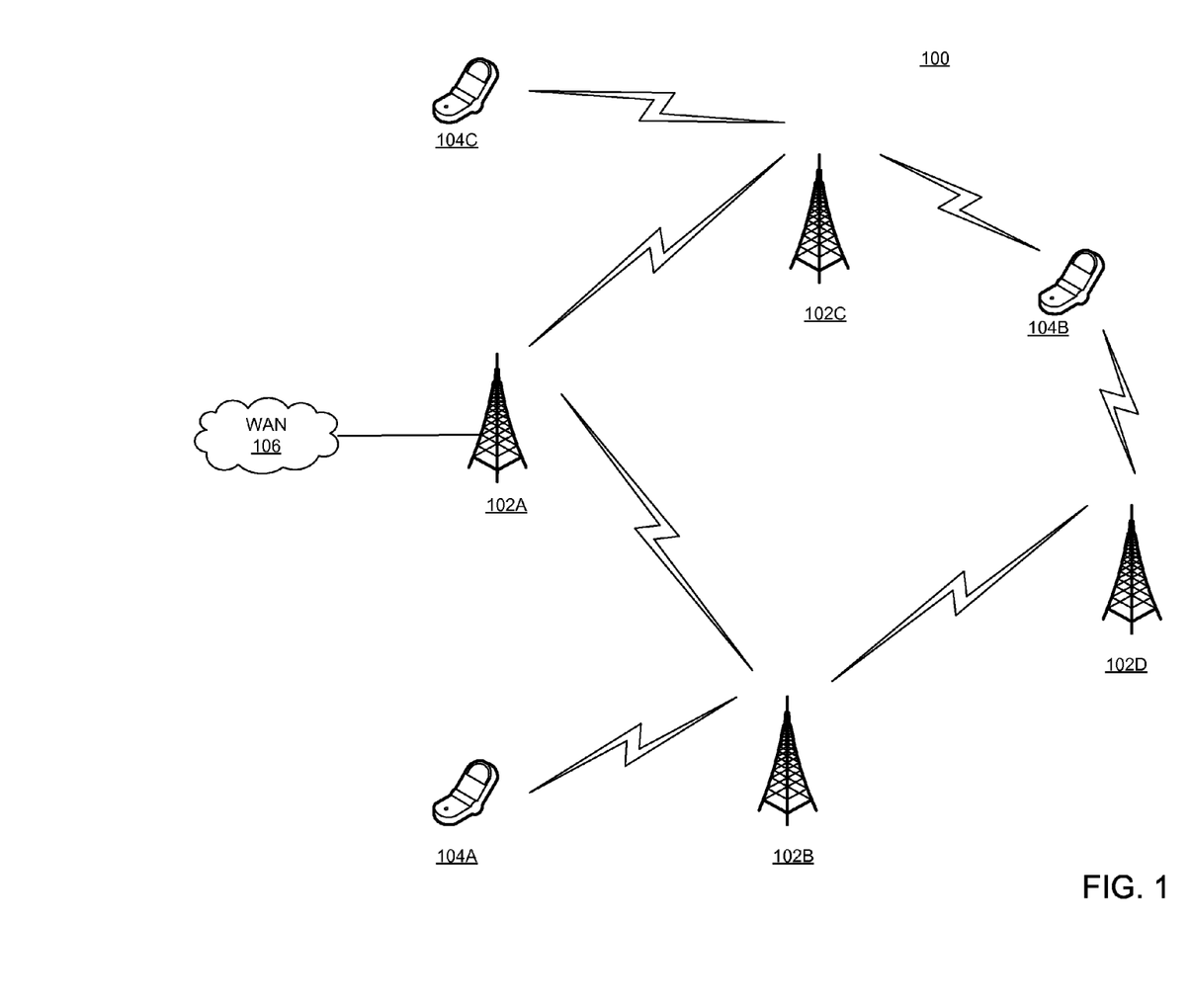
FIG. 1 is a conceptual block diagram illustrating an example of a wireless network.

FIG. 1 is a conceptual block diagram illustrating an example of a communications network. The communication network is shown as a wireless network 100, however, those skilled in the art will appreciate that the various aspects of a communications network disclosed herein can readily be extended to wired networks. The wireless network 100 may be a WLAN, such as an IEEE 802.11 network, or any other suitable network. The wireless network 100 is shown with several wireless nodes, generally designated as nodes 102 and 104. Each wireless node is capable of receiving and/or transmitting data. In the discussion that follows, the term "receiving node" may be used to refer to a node that is receiving data and the term "transmitting node" may be used to refer to a node that is transmitting data. Such a reference does not imply that a wireless node is incapable of performing both transmit and receive functions.

A wireless node may be implemented in various ways. By way of example, a wireless node may be implemented as an access terminal, relay point, access point, or any combination thereof. Referring to FIG. 1, the wireless nodes designated as 102 are implemented as access points or relay point and the wireless nodes designated as 104 are implemented as an access terminal. The access point 102A serves as a bridge for the access terminals 104 to another network 106 (e.g., a wide area network such as the Internet). The relay points 102B-102D facilitate communications within the wireless network 100 through peer-to-peer connections. By way of example, a relay point 102B may establish an upstream connection with the access point 102A and a downstream connection with an access terminal 104A to facilitate communications between the two.

Figure 2:
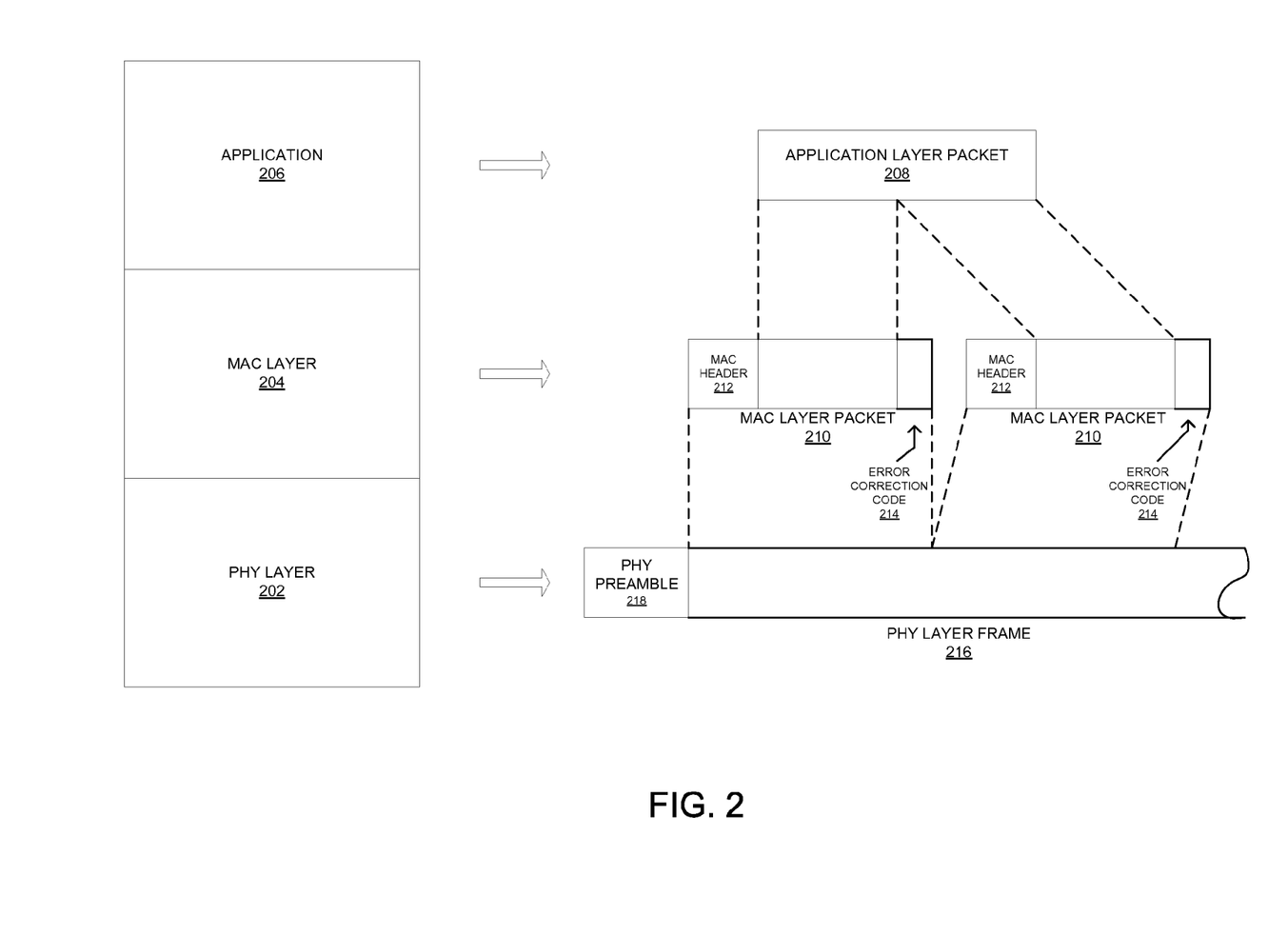
FIG. 2 is a conceptual diagram illustrating an example of a protocol stack for a wireless node.

FIG. 2 is a conceptual diagram illustrating an example of a protocol stack for a wireless node. The protocol utilizes a layered structure that includes a physical (PHY) layer 202 that implements all the physical and electrical specifications to interface to a shared wireless channel, a Medium Access Control (MAC) layer 204 that coordinates access to the shared wireless medium, and an application layer 206 that perform various data processing functions including, by way of example, speech and multimedia codecs and graphics processing.

When the wireless node provides a transmitter function, the application layer process data, segment the data into application layer packets, and hand down the application layer packets to the MAC layer 204. A application layer packet 208 is shown in FIG. 2 for the purposes of explanation. The MAC layer 204 may then optionally break the application layer packet 208 into smaller fragments. MAC layer packets 210 are then assembled with each fragment being carried by the payload of a MAC packet 210. Each MAC layer packet 210 includes a MAC header 212 and error detection code 214. The MAC layer packet is sometimes referred to as a MAC Protocol Data Unit (MPDU), but may be also referred to as a frame, packet, timeslot, segment, or any other suitable nomenclature. Although not shown, the application layer packet may not be fragmented by the MAC layer 204. Instead, a MAC layer packet may be used to carry an entire application layer packet, or multiple application layer packets, in its payload.

The MAC layer 204 also coordinates access to the wireless medium. In one configuration of a wireless node, the MAC layer 204 uses a Carrier Sense Multiple Access (CSMA) algorithm to sense the wireless medium through energy detection and transmits only when the medium is free. However, as those skilled in the art will appreciate, various other algorithms may be used to coordinate access to the wireless medium.

When the MAC layer 204 decides to transmit, it hands down a block of MAC layer packets to the PHY layer 202. The PHY layer 202 assembles a PHY layer frame 216 by assembling the block of data packets from the MAC layer 204 into the payload and adding a preamble 218. The PHY layer 202 is also responsible for modulating and coding the PHY layer frame 216 to the desired data rate. The preamble 218, which is sometimes referred to as Physical Layer Convergence Protocol (PLCP), is used to enable the receiving node to detect the start of the frame and synchronize to the transmitter node's data clock.

When the wireless node provides a receiver function, the process is reversed. That is, the PHY layer 202 detects an incoming frame from the wireless medium. The preamble allows the PHY layer 202 to lock in on the signal and decode the frame using the modulation and coding scheme. Once decoded, the PHY layer 202 recovers the block of MAC layer data packets 210 carried in the payload of the PHY layer frame. As shown in FIG. 2, the PHY layer 202 delivers the data packets to the MAC layer 204.

The MAC layer 204 checks the error detection code for each MAC layer data packet to determine whether it was successfully decoded. If the error detection code for a MAC layer packet 210 indicates that it was successfully decoded, then the packet is provided to the application layer 206. If the error detection code for a MAC layer packet 210 indicates that it was unsuccessfully decoded, the MAC layer packet 210 is discarded. A Block ACK may be sent back to the transmitting node indicating which data packets were successfully decoded. The transmitting node uses the Block ACK to determine which data packets, if any, require retransmission.

The protocol for the wireless node may be modified to enable HARQ. As will be explained in greater detail later, this may be achieved by modifying the protocol to add an HARQ layer to support (1) the exchange of messages between two peer nodes to set up and establish a HARQ connection, (2) the storage of undecodable MAC layer data packets for combining with future transmissions, and (3) the use of MAC layer ACK (or Block ACK) mechanism to request retransmission of MAC layer data packets using incremental redundancy.

The HARQ set up may be implemented with a protocol that allows two peer nodes to exchange messages to determine whether they are HARQ enabled. In accordance with one configuration of the protocol, a transmitting node determines whether a receiving node is HARQ enabled. Upon determining that the receiving node is HARQ enabled, the transmitting node sets up the required protocols and state machines to support HARQ on the HARQ layer. Similarly, the receiving node sets up the required protocols and state machines at its end to support HARQ on the HARQ layer. The transmitting node also assigns a HARQ session identifier (ID) to each HARQ session between the transmitting and receiving nodes. The assigned ID is used by the receiving node to configure and identify the packets belonging to a given HARQ session. In addition, the transmitting and receiving nodes may negotiate the coding scheme to be used. Alternatives for HARQ coding schemes may include turbo coding, Low Density Parity Check (LDPC), simple Chase combining, or any other suitable coding scheme. The HARQ set up protocol may also be used to initialize an HARQ state machine at the transmitting and receiving nodes.

Figure 3:
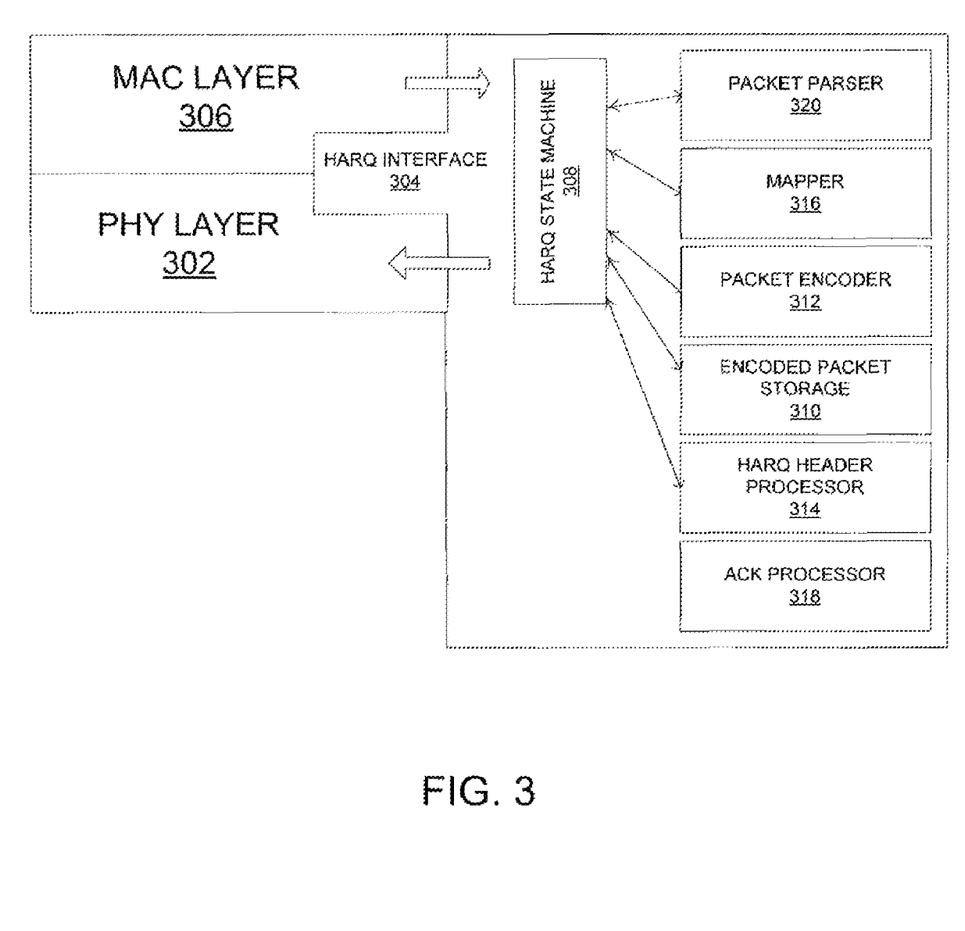
FIG. 3 is a conceptual diagram illustrating an example of a protocol stack for a transmitting node with HARQ.

FIG. 3 is a conceptual diagram illustrating an example of a protocol stack for a transmitting node with HARQ. The protocol stack includes a PHY layer 302, a HARQ layer 304 and a MAC layer 306.

When an HARQ connection is set up between a pair of peers nodes, the PHY and MAC layers 302 and 306 communicate via the HARQ layer 304. A HARQ state machine 308 is started between the nodes. The MAC layer 306 forwards a block of MAC layer data packets to the HARQ layer 304.

The HARQ layer 304 includes a packet parser 320 which parses the block of data packets to determine if the block contains any retransmitted data packets. In the event that any of the data packets are being retransmitted, the HARQ layer 304 obtains the parity symbols bits from an encoded packet storage 310. If the block includes new data packets (i.e., data packets that have not yet been transmitted), then an encoder 312 generates systematic symbols for transmission and parity symbols for future transmissions. The parity symbols are stored in the encoded packet storage 310. Once the block of data packets have been parsed and encoded, a HARQ header processor 314 is used to generate a HARQ header. In some configurations, the HARQ header is incorporated into the preamble of the PHY layer frame, which is described in more detail later. A mapper 316 may be used to map data packet sequence numbers to PHY layer sequence numbers for reordering the data packets at the receiving node.

When a Block ACK is received at the MAC layer 306, an ACK processor 318 is provided information identifying which data packets have been successfully decoded. The parity symbols corresponding to the data packets that have been decoded are removed from the encoded packet storage 310. The Block ACK may also indicate the number of times an undecodable packet has been transmitted. This information enables the HARQ layer 308 to determine which set of parity symbols from the encoded packet storage 310 will be sent when a retransmission of the data packet occurs.

Figure 4:
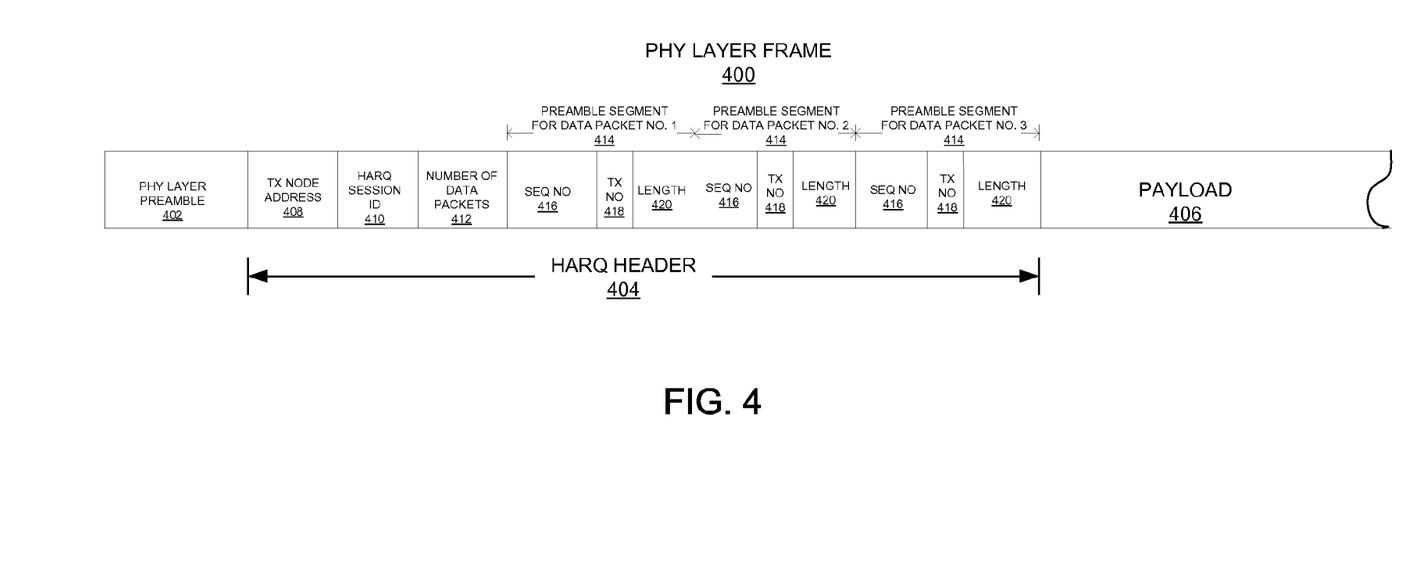
FIG. 4 is a conceptual diagram illustrating an example of a PHY layer frame.

FIG. 4 is a conceptual diagram illustrating an example of a PHY layer frame. The PHY layer frame 400 includes a PHY layer preamble 402, a HARQ header 404, and a payload 406. An example of a preamble 402 is a PLCP header, which was discussed earlier and is well known in the art. The payload 406 carries one or more MAC layer data packets. The HARQ header 404 may be configured in various ways depending on the specific application and the overall design constraints imposed on the overall system. An example of an HARQ header will now be presented with reference to FIG. 4.

The HARQ header 404 may include a flag that indicates whether the frame is an HARQ frame. In the case of IEEE 802.11, one of the reserved fields in the PLCP header may be used for this purpose. The HARQ header 404 may also include a field 408 for the transmitting node's address and a field 410 to identify the HARQ session. The combination of the address and HARQ session will determine which instance of the HARQ state machine 508 (see FIG. 5) must be used for processing the received frame. The next field 412 is used to identify the number of data packets in the frame. A three-field preamble segment 414 is then provided for each data packet. The first field 416 provides the PHY layer sequence number to allow the receiving node to properly reorder the data packets for processing by the application layers. The second field 418 provides the transmission number (i.e., how many times the data packet has been transmitted). This enables the receiving node to properly combine previously transmitted systematic and parity symbols with the received data packet for decoding. The third field 420 provides the length of the data packet. Since the frame carries multiple data packets, the length of each data packet may be used by the receiving node to determine the boundaries within the payload for each data packet.

As those skilled in the art will readily appreciate, many variations of the HARQ header described in connection with FIG. 4 may be used in actual deployments of wireless networks. In any given deployment, some, all, or none of the information described above may be included in the HARQ header. Additional information may also be included in the HARQ header, with either some, all, or none of the information shown in FIG. 4. The order of the information provided in the HARQ header may also be varied.

Figure 5:
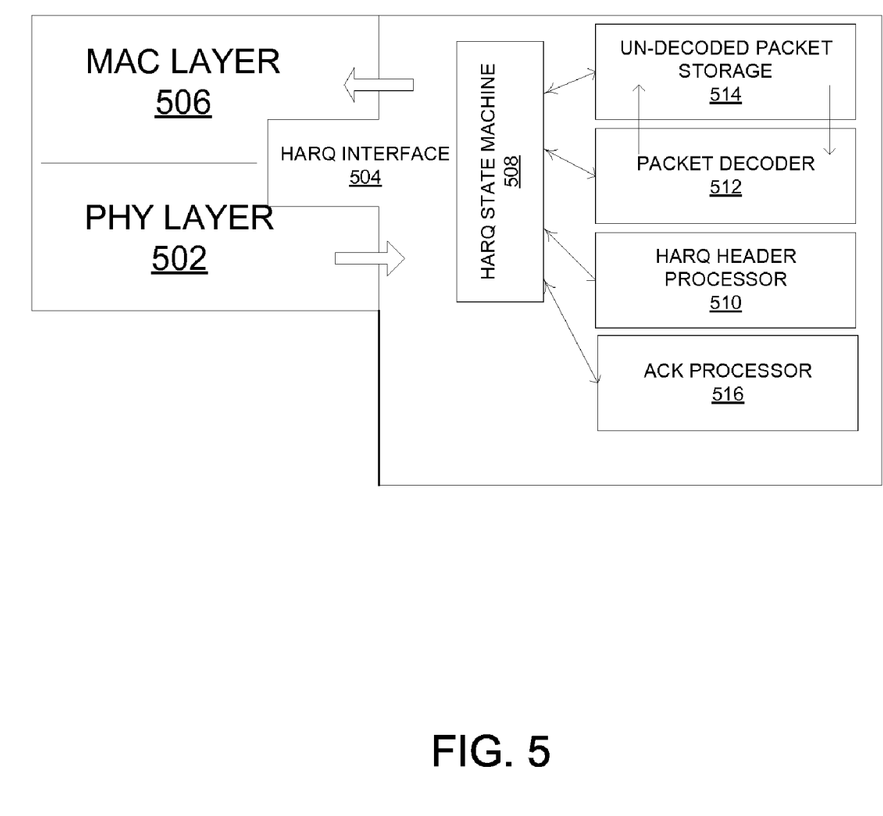
FIG. 5 is a conceptual diagram illustrating an example of a protocol stack for a receiving node with HARQ.

FIG. 5 is a conceptual diagram illustrating an example of a protocol stack for a receiving node with HARQ. The protocol stack is similar to that described in connection with the transmitting node, having a PHY layer 502, HARQ layer 504, and a MAC layer 506.

The PHY layer 502 determines whether a received PHY layer frame uses HARQ by examining the preamble of the frame. If the PHY layer 502 determines that a frame uses HARQ, the PHY layer 502 recovers the block of data packets from the payload and provides it, along with the HARQ header, to the HARQ layer 504. An HARQ header processor 510 parses the block into individual data packets using the information provided in the HARQ header. A packet decoder 512 then decodes each data packet by combining it with any previously transmitted systematic and/or parity symbols for the data packet. The systematic and parity symbols for the data packets are stored in an undecoded packet storage 514. The decoded data packets are then provided to the MAC layer 506 that performs the error detection code check to determine whether each data packet was properly decoded at the HARQ layer 504. If a given data packet is successfully decoded, then the MAC layer 506 provides the data packet to the application layer (not shown). The MAC layer 506 also informs the HARQ interface 504 to eliminate all systematic and parity symbols corresponding to the data packet from the undecoded packet storage 514. If the data packet is not successfully decoded, then the received symbols are stored in the undecoded packet storage 514 for combining with future transmissions of the data packet.

The HARQ layer 504 also includes an ACK processor 516. In some configurations, the ACK processor 516 returns a Block ACK to the transmitting node indicating which data packets have been successfully decoded. As explained earlier, the transmitting node uses this information to determine which data packets require retransmission.

Figure 6:
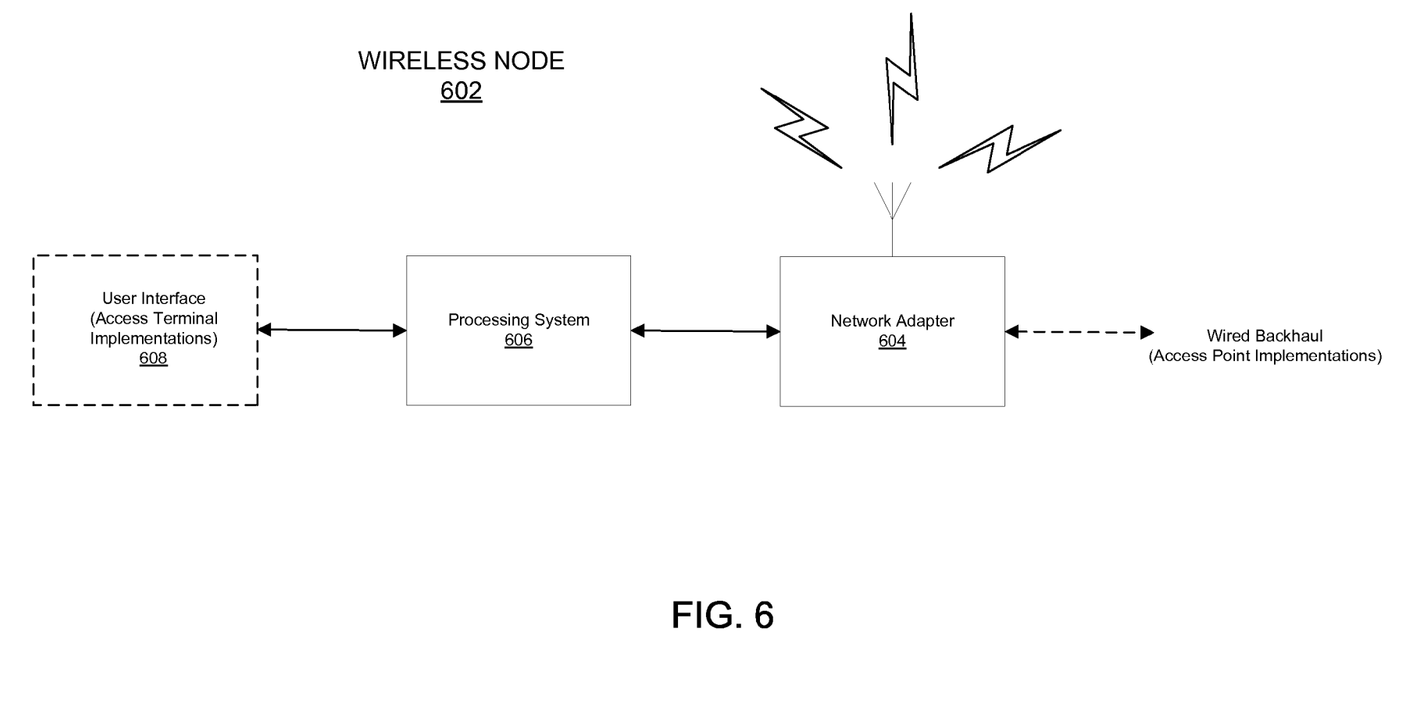
FIG. 6 is a block diagram illustrating an example of the functionality of a wireless node.

FIG. 6 is a block diagram illustrating an example of the functionality of a wireless node. The following descriptive is informative in nature and broadly defines the functionality of each block. Only the pertinent functionality to various concepts described throughout this disclosure will be described. Those skilled in the art will recognize that these functional blocks can provide other functionality that is not described herein. In this example, the wireless node 602 includes two functional blocks: a network adapter 604 and a processing system 606.

The network adapter 604 may be configured as a transceiver that provides both a transmitter and receiver function. The transmitting function includes modulating a carrier with information. The receiver function includes demodulating a carrier to recover information. The network adapter 604 provides various functions such as RF front-end processing, ADC, timing and frequency estimation, channel estimation, turbo coding etc. In summary, the network adapter 604 provides the complete PHY layer implementation of the wireless node 602.

The processing system 606, either alone or in combination with other entities in the wireless node, is configured to implement all functionality above the PHY layer, however, in some configurations, the processing system 606 may also be used to implement all or part of the PHY layer. In at least one configuration, the processing system 606 is configured to use the transmitter and receiver functions of the network adapter 604 to support communications with other wireless nodes in the network. The processing system 606 implements the HARQ layer that supports HARQ using a WLAN protocol with MAC based feedback.

The wireless node 602 may function as an access terminal, access point, relay point, or any combination thereof. A wireless node 602 that functions as an access terminal may include a user interface 608. The user interface 608 may include a display, keypad, speaker, microphone, and/or any other suitable interface that enables a user to operate the access terminal. The user interface 608 is used to control the data that is transmitted and received by the processing system 606 over a wireless uplink connection maintained by the network adapter 604.

A wireless node 602 that functions as an access point includes a network adapter 604 that is capable of maintaining any suitable number of wireless downlink connections with access terminals and/or relay points, as well as maintain one or more uplink connections to support the backhaul. The uplink connection may be wired or wireless. By way of example, the access point may support a wireless uplink connection to a relay point and a wired uplink connection to another network (e.g., the Internet).

The processing system 606 may include one or more processors. A processor may be a general purpose microprocessor, a microcontroller, a Digital Signal Processor (DSP), an Application Specific Integrated Circuit (ASIC), a Field Programmable Gate Array (FPGA), a Programmable Logic Device (PLD), logic circuits, discrete hardware components, or any other suitable entity that can perform calculations or other manipulations of information.

The processing system 606 may also include one or more machine-readable media to provide data storage and/or to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system.

Figure 7:
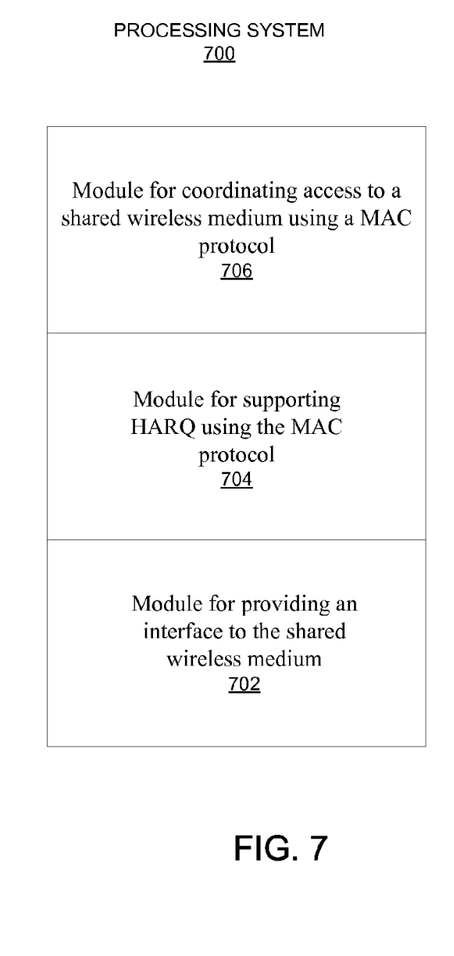
FIG. 7 is a block diagram illustrating an example of the functionality of a processing system in a wireless node.

FIG. 7 is a block diagram illustrating an example of the functionality of a wireless node 700. In this example, the wireless node 700 includes a module 706 for coordinating access to a shared wireless medium using a MAC protocol, a module 702 for providing an interface to the shared wireless medium, and a module 704 for supporting HARQ using the MAC protocol.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. An apparatus for communication, comprising:
   a MAC layer configured to coordinate access to a shared wireless medium using a MAC protocol;
   a PHY layer configured to provide an interface to the shared wireless medium; and
   a HARQ layer between the MAC and PHY layers, the HARQ layer being configured to support HARQ using the MAC protocol, wherein the HARQ layer is further configured to communicate with a peer node to determine whether the peer node is HARQ capable.

2. The apparatus of claim 1 wherein the MAC protocol comprises an IEEE 802.11 protocol.

3. The apparatus of claim 1 wherein the apparatus comprises a transmitting node, the HARQ layer being further configured to communicate with the peer node to determine whether the peer node is HARQ capable.

4. The apparatus of claim 3 wherein the HARQ layer is further configured to set up a protocol and state machine to support HARQ if the peer node is HARQ capable.

5. The apparatus of claim 1 wherein the apparatus comprises a receiving node, the HARQ layer being further configured to receive a message from the peer node requesting HARQ and set up a protocol and state machine to support HARQ in response to the message.

6. The apparatus of claim 1 wherein the apparatus comprises a transmitting node, the HARQ layer being further configured to assign a HARQ session ID to each HARQ session it maintains with the peer node.

7. The apparatus of claim 1 wherein the apparatus comprises a receiving node, the HARQ layer being further configured to receive a plurality of data packets each having a HARQ session ID and use the HARQ session IDs to configure and identify the data packets.

8. The apparatus of claim 1 wherein the HARQ layer is further configured to communicate with the peer node to negotiate a coding scheme for the HARQ.

9. The apparatus of claim 8 wherein the negotiated coding scheme comprises turbo coding, LDPC, chase combining, or any combination thereof.

10. The apparatus of claim 1 wherein the HARQ layer is further configured to receive a data packet from the MAC layer for transmission to the peer node and determine whether the data packet has been previously transmitted.

11. The apparatus of claim 10 wherein the HARQ layer, if it determines that the data packet has not been previously transmitted, is further configured to encode the data packet to generate systematic and parity symbols, provide the systematic symbols to the PHY layer for transmission, and store at least a portion of the parity symbols.

12. The apparatus of claim 11 wherein the HARQ layer being further configured to remove said at least a portion of the parity symbols from storage in response to an acknowledgement received by the MAC layer indicating that the peer node has successfully decoded the data packet transmitted by the PHY layer.

13. The apparatus of claim 10 wherein the HARQ layer, if it determines that the data packet has been previously transmitted, is further configured to retrieve from storage at least a portion of parity symbols generated from encoding the data packet for a first one of the previous transmissions, and provide said at least a portion of the parity symbols to the PHY layer for transmission.

14. The apparatus of claim 13 wherein the HARQ layer is further configured to determine that the data packet has been previously transmitted in response to a block acknowledgement received by the MAC layer.

15. The apparatus of claim 1 wherein the HARQ layer is further configured receive from the PHY layer a data packet that was transmitted by the peer node, decode the data packet, and provide the decoded data packet to the MAC layer.

16. The apparatus of claim 15 wherein the data packet includes a plurality of symbols, the HARQ layer being further configured to decode the data packet by combining the symbols in the data packet with any symbol received by the HARQ layer associated with one or more previous transmissions of the data packet.

17. The apparatus of claim 16 wherein the HARQ layer is further configured to store the symbols in the data packet for combining with one or more future transmissions of the data packet in response to an indication from the MAC layer that the data packet was not successfully decoded by the HARQ layer.

18. The apparatus of claim 16 wherein the HARQ layer is further configured to remove from storage said any symbols received by the HARQ layer associated with said one or more previous transmissions of the data packet in response to an indication from the MAC layer that the data packet was successfully decoded by the HARQ layer.

19. The apparatus of claim 1 wherein the HARQ layer is further configured to support a HARQ header that is combined with a PHY layer header for a data packet, wherein the data packet conforms to the MAC protocol.

20. The apparatus of claim 1 wherein the HARQ layer is further configured to receive a data packet from the MAC layer for transmission to the peer node and generate a HARQ header for the data packet.

21. The apparatus of claim 20 wherein the HARQ header comprises a transmit number indicating the number of times the data packet has been previously transmitted.

22. The apparatus of claim 20 wherein the HARQ header comprises a length corresponding to the data packet.

23. A method for communication, comprising:
coordinating access to a shared wireless medium using a MAC protocol;
providing an interface to the shared wireless medium; and
supporting HARQ using the MAC protocol, wherein the HARQ layer is further configured to communicate with a peer node to determine whether the peer node is HARQ capable.

24. The method of claim 23 wherein the MAC protocol comprises an IEEE 802.11 protocol.

25. The method of claim 23 wherein the support of HARQ comprises communicating from a transmitting node to the peer node to determine whether the peer node is HARQ capable.

26. The method of claim 25 wherein the support of HARQ further comprises setting up a protocol and state machine at the transmitting node to support HARQ if the peer node is HARQ capable.

27. The method of claim 23 wherein the support of HARQ comprises receiving a message at a receiving node from the peer node requesting HARQ and setting up a protocol and state machine to support HARQ in response to the message.

28. The method of claim 23 wherein the support of HARQ comprises assigning at a transmitting node a HARQ session ID to each HARQ session maintained with the peer node.

29. The method of claim 23 wherein the support of HARQ comprises receiving a plurality of data packets at a receiving node, each of the data packets having a HARQ session ID, and wherein the support of HARQ further comprises using the HARQ session IDs to configure and identify the data packets.

30. The method of claim 23 wherein the support of HARQ comprises communicating with the peer node to negotiate a coding scheme for the HARQ.

31. The method of claim 30 wherein the negotiated coding scheme comprises turbo coding, LDPC, chase combining, or any combination thereof.

32. The method of claim 23 wherein the support of HARQ comprises receiving a data packet from a MAC layer for transmission to the peer node and determining whether the data packet has been previously transmitted.

33. The method of claim 32 wherein the support of HARQ further comprises determining that the data packet has not been previously transmitted, encoding the data packet to generate systematic and parity symbols, providing the systematic symbols to a PHY layer for transmission, and storing at least a portion of the parity symbols.

34. The method of claim 33 wherein the support of HARQ further comprises removing said at least a portion of the parity symbols from storage in response to an acknowledgement received by the MAC layer indicating that the peer node has successfully decoded the data packet transmitted by the PHY layer.

35. The method of claim 32 wherein the support of HARQ further comprises determining that the data packet has been previously transmitted, retrieving from storage at least a portion of parity symbols generated from encoding the data packet for a first one of the previous transmissions, and providing said at least a portion of the parity symbols to a PHY layer for transmission.

36. The method of claim 23 wherein the support of HARQ comprises determining that the data packet has been previously transmitted in response to a block acknowledgement received by a MAC layer.

37. The method of claim 23 wherein the support of HARQ comprises receiving from a PHY layer a data packet that was transmitted by the peer node, decoding the data packet, and providing the decoded data packet to a MAC layer.

38. The method of claim 37 wherein the data packet includes a plurality of symbols, the support of the HARQ further comprising decoding the data packet by combining the symbols in the data packet with any received symbols associated with on one or more previous transmissions of the data packet.

39. The method of claim 38 wherein the support of HARQ further comprises storing the symbols in the data packet for combining with one or more future transmissions of the data packet in response to an indication from the MAC layer that the data packet was not successfully decoded.

40. The method of claim 38 wherein the support of HARQ further comprises removing from storage said any received symbols associated with said one or more previous transmissions of the data packet in response to an indication from the MAC layer that the data packet was successfully decoded.

41. The method of claim 23 wherein the support of the HARQ comprises supporting a HARQ header that is combined with a PHY layer header for a data packet, wherein the data packet conforms with the MAC protocol.

42. The method of claim 23 wherein the support of the HARQ comprises receiving a data packet from a MAC layer for transmission to the peer node and generating a HARQ header for the data packet.

43. The method of claim 42 wherein the HARQ header comprises a transmit number indicating the number of times the data packet has been previously transmitted.

44. The method of claim 42 wherein the HARQ header comprises a length corresponding to the data packet.

45. An apparatus for communication, comprising:
means for coordinating access to a shared wireless medium using a MAC protocol;
means for providing an interface to the shared wireless medium; and
means for supporting HARQ using the MAC protocol, wherein the HARQ layer is further configured to communicate with a peer node to determine whether the peer node is HARQ capable.

46. The apparatus of claim 45 wherein the MAC protocol comprises an IEEE 802.11 protocol.

47. The apparatus of claim 45 wherein the means for supporting HARQ comprises means for communicating with the peer node to determine whether the peer node is HARQ capable.

48. The apparatus of claim 45 wherein the means for supporting HARQ comprises means for communicating with a receiving node to determine whether the peer node is HARQ capable.

49. The apparatus of claim 48 wherein the means for supporting HARQ further comprises means for setting up a protocol and state machine node to support HARQ if the peer node is HARQ capable.

50. The apparatus of claim 45 wherein the means for supporting HARQ comprises means for receiving a message from the peer node requesting HARQ and means for setting up a protocol and state machine to support HARQ in response to the message.

51. The apparatus of claim 45 wherein the means for supporting HARQ comprises means for assigning a HARQ session ID to each HARQ session maintained with a receiving node.

52. The apparatus of claim 45 wherein the means for supporting HARQ comprises means for receiving a plurality of data packets at a receiving node, each of the data packets having a HARQ session ID, and means for using the HARQ session IDs to configure and identify the data packets.

53. The apparatus of claim 45 wherein the means for supporting HARQ comprises means for communicating with the peer node to negotiate a coding scheme for the HARQ.

54. The apparatus of claim 53 wherein the negotiated coding scheme comprises turbo coding, LDPC, chase combining, or any combination thereof.

55. The apparatus of claim 45 wherein the means for supporting HARQ comprises means for receiving a data packet from a MAC layer for transmission to the peer node and means for determining whether the data packet has been previously transmitted.

56. The apparatus of claim 55 wherein, if the data packet has not been previously transmitted, the means for supporting HARQ further comprises means for encoding the data packet to generate systematic and parity symbols, means for providing the systematic symbols to a PHY layer for transmission, and means for storing at least a portion of the parity symbols.

57. The apparatus of claim 56 wherein the means for supporting HARQ further comprises means for removing said at least a portion of the parity symbols from storage in response to an acknowledgement received by the MAC layer indicating that the peer node has successfully decoded the data packet transmitted by the PHY layer.

58. The apparatus of claim 55 wherein, if the data packet has been previously transmitted, the means for supporting HARQ further comprises means for retrieving from storage at least a portion of parity symbols generated from encoding the data packet for a first one of the previous transmissions, and means for providing said at least a portion of the parity symbols to a PHY layer for transmission.

59. The apparatus of claim 45 wherein the means for supporting HARQ comprises means for determining that the data packet has been previously transmitted in response to a block acknowledgement received by a MAC layer.

60. The apparatus of claim 45 wherein the means for supporting HARQ comprises means for receiving from a PHY layer a data packet that was transmitted by the peer node, means for decoding the data packet, and means for providing the decoded data packet to a MAC layer.

61. The apparatus of claim 60 wherein the data packet includes a plurality of symbols, the means for supporting HARQ further comprising means for decoding the data packet by combining the symbols in the data packet with any received symbols associated with one or more previous transmissions of the data packet.

62. The apparatus of claim 61 wherein the means for supporting HARQ comprises means for storing the symbols in the data packet for combining with one or more future transmissions of the data packet in response to an indication from the MAC layer that the data packet was not successfully decoded.

63. The apparatus of claim 61 wherein the means for supporting HARQ further comprises means for removing from storage said any received symbols associated with said one or more previous transmissions of the data packet in response to an indication from the MAC layer that the data packet was successfully decoded.

64. The apparatus of claim 45 wherein the means for supporting HARQ comprises means for supporting a HARQ header that is combined with a PHY layer header for a data packet, wherein the data packet conforms with the MAC protocol.

65. The apparatus of claim 45 wherein the means for supporting HARQ comprises means for receiving a data packet from a MAC layer for transmission to the peer node and means for generating a HARQ header for the data packet.

66. The apparatus of claim 65 wherein the HARQ header comprises a transmit number which indicates the number of times the data packet has been previously transmitted.

67. The apparatus of claim 65 wherein the HARQ header comprises a length corresponding to the data packet.

68. A computer-program product for communication, comprising:
   a machine-readable medium comprising instructions executable by a processing system to:
   coordinate access to a shared wireless medium using a MAC protocol;
   provide an interface to the shared wireless medium; and
   support HARQ using the MAC protocol, wherein the HARQ layer is further configured to communicate with a peer node to determine whether the peer node is HARQ capable.

69. An access terminal, comprising:
   a user interface;
   an application layer configured to support the user interface;
   a MAC layer configured to coordinate access to a shared wireless medium using a MAC protocol to support the application layer;
   a PHY layer configured to provide an interface to the shared wireless medium; and
   a HARQ layer between the MAC and PHY layers, the HARQ layer being configured to support HARQ using the MAC protocol, wherein the HARQ layer is further configured to communicate with a peer node to determine whether the peer node is HARQ capable.

70. An access point, comprising:
   a wireless network adapter configured to support a backhaul connection for a peer node to a network;
   a MAC layer configured to coordinate access to a shared wireless medium using a MAC protocol to support communications with the peer node;
   a PHY layer configured to provide an interface to the shared wireless medium; and
   a HARQ layer between the MAC and PHY layers, the HARQ layer being configured to support HARQ using the MAC protocol, wherein the HARQ layer is further configured to communicate with a peer node to determine whether the peer node is HARQ capable.

\* \* \* \* \*